(12) United States Patent
Maekawa

(10) Patent No.: US 6,217,176 B1
(45) Date of Patent: Apr. 17, 2001

(54) ANTIGLARE FILM AND USE THEREOF

(75) Inventor: Tomoyuki Maekawa, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/459,457

(22) Filed: Dec. 13, 1999

(30) Foreign Application Priority Data

Dec. 18, 1998 (JP) ................................. 10-360614

(51) Int. Cl.⁷ .................................................. G02B 27/00
(52) U.S. Cl. .................... 359/601; 359/608; 359/613; 359/599
(58) Field of Search ................................... 359/601, 608, 359/613, 599, 536, 537, 538, 837

(56) References Cited

U.S. PATENT DOCUMENTS

| | | | |
|---|---|---|---|
| 5,919,555 | * 7/1999 | Yasuda et al. | 428/206 |
| 5,995,288 | * 11/1999 | Kashima et al. | 359/599 |
| 6,008,940 | * 12/1999 | Michihata et al. | 359/483 |
| 6,060,183 | * 5/2000 | Higashi et al. | 428/701 |
| 6,074,741 | * 6/2000 | Murata et al. | 428/327 |

* cited by examiner

*Primary Examiner*—Mohammad Y. Sikder
(74) *Attorney, Agent, or Firm*—Parkhurst & Wendel, L.L.P

(57) ABSTRACT

An antiglare film is provided which has a desired range of haze, does not sacrifice external light reflection preventive properties, can improve sharpness of transmitted images, and can lower scintillation. An antiglare film 10 comprises a transparent substrate film 12 and an antiglare layer 18 stacked on the transparent substrate 12. The antiglare layer 18 is formed of a light-transparent resin 14 containing light-transparent fine particles 16 and 46. The difference in refractive index between the light-transparent fine particles 16 and 46 and the light-transparent resin 14 is not less than 0.03 and not more than 0.20. The light-transparent fine particles 16 are different from the light-transparent fine particles 46 in refractive index.

10 Claims, 1 Drawing Sheet

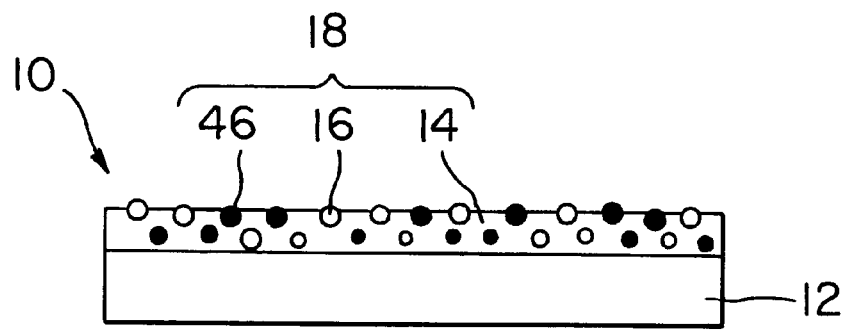
F I G. 1
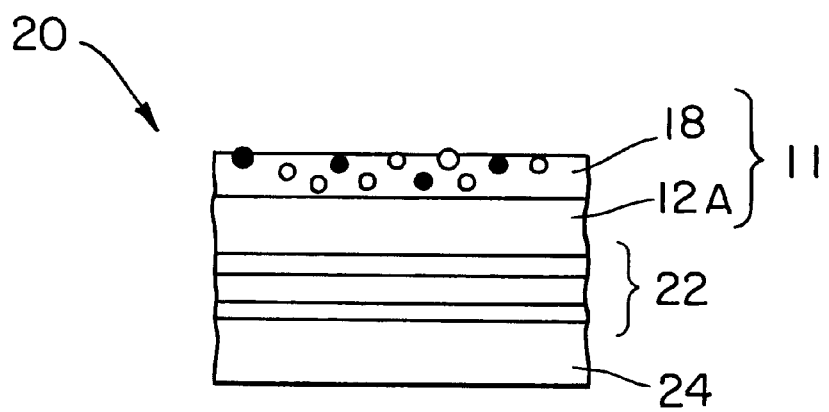
F I G. 2
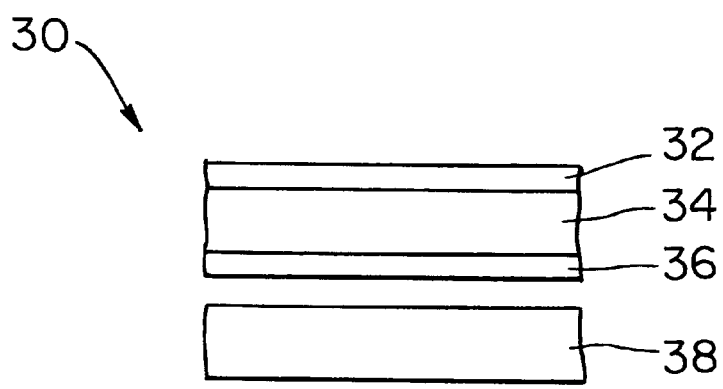
F I G. 3

ANTIGLARE FILM AND USE THEREOF

TECHNICAL FIELD

This invention relates to an antiglare film for provision on the surface of displays for high definition images, such as CRT and liquid crystal panels, used in image display in computers, word processors, televisions and the like, and a polarizing film and a transmission type display device using the antiglare film.

BACKGROUND ART

In the above displays, when light emitted mainly from the interior of the display goes straight without diffusion on the surface of the display, the surface of the display, when viewed with the naked eye, is in the glare of the light. In order to prevent this phenomenon, an antiglare film for diffusing the light emitted from the interior of the display to some extent is provided on the surface of the display.

For example, Japanese Patent Laid-Open Publication Nos. 18706/1994 and 20103/1998 disclose antiglare films formed by coating a resin containing a filler, such as silicon dioxide (silica), onto the surface of a transparent substrate film.

These antiglare films are classified into a type wherein concaves and convexes are formed on the surface of the antiglare layer by coagulation of particles, such as coagulative silica, a type wherein organic fillers having a particle diameter larger than the coating thickness are added to a resin to form concaves and convexes on the surface of the layer, and a type wherein a film having thereon concaves and convexes is laminated on a layer to transfer the concaves and convexes onto the layer.

In all the types of the above conventional antiglare films, light diffusing/antiglare action is created by the surface shape of the antiglare layer, and increasing the size of concaves and convexes is necessary for enhancing antiglare properties. Increasing the size of concaves and convexes, however, increases the haze of the coating and in its turn disadvantageously lowers the transmissive visibility.

A light-diffusive film similar to the above antiglare films is disclosed, for example, for a reflection type liquid crystal display device (Journal of the Illuminating Engineering Institute of Japan MD-96–48, 277–282 (1996)). In this light-diffusive film, fine particles are dispersed within the layer to attain a light diffusion effect.

In order to attain satisfactory light diffusion effect by the contemplated internal scattering effect, the diameter of the fine particles should be increased. This poses a problem in that the sharpness of images is very low although the haze is high.

When a film for attaining light diffusion effect by the internal scattering effect, such as the light-diffusive film, is provided on the surface of a display for antiglare purposes, the reflection of external light on the surface of the display cannot be prevented because the surface of the film is substantially flat. That is, the film does not disadvantageously have the so-called "external light reflection preventive properties."

In addition, in the conventional antiglare films described above, shining called "scintillation" occurs on the film surface, disadvantageously leading to deteriorated visibility of the display screen.

For the antiglare films, haze is one of the evaluation criteria. Lowering the haze of the surface increases shining called scintillation. When the haze is increased in order to eliminate this problem, the whole image becomes whitish and the black density is lowered. This unfavorably results in lowered contrast. On the other hand, lowering the haze for removing the whitening effect disadvantageously increases the so-called "external light reflection" and "shining."

With a view to solving the above problems, the present inventors have developed an antiglare film which, without sacrificing the diffusing and antiglare properties, can improve the sharpness of transmitted images, can lower scintillation, and has external light reflection preventive properties. An application relating to this antiglare film has been filed as Japanese Patent Laid-Open No. 126494/1998.

In order to realize the above properties, the haze should be regulated by the internal scattering effect. The internal scattering effect can be regulated by regulating the mixing ratio of the light-transparent fine particles and the light-transparent resin, the difference in refractive index between the light-transparent fine particles and the light-transparent resin, the particle diameter of the light-transparent fine particles, and the thickness on a dry basis of the antiglare layer.

The regulation of the mixing ratio, the particle diameter, and the coating thickness, however, affect the surface shape. Therefore, the haze cannot be solely regulated while maintaining a certain level of sharpness of transmitted images, that is, external light reflection preventive properties.

The internal scattering effect can also be regulated by the refractive index of the light-transparent fine particles. The regulation of the refractive index, however, disadvantageously causes a limitation on the regulation of the haze.

DISCLOSURE OF THE INVENTION

Under the above circumstances, the present invention has been made, and it is an object of the present invention to provide an antiglare film, which has a desired range of haze, does not lower external light reflection preventive properties, can improve sharpness of transmitted images, and can lower scintillation, and to provide a polarizing plate and a transmission type display device using the antiglare film.

According to one aspect of the present invention, there is provided an antiglare film comprising: a transparent substrate film; and an antiglare layer stacked onto the transparent substrate film, the antiglare layer being formed of a light-transparent resin containing two or more types of light-transparent fine particles, the difference in refractive index between the light-transparent fine particles and the light-transparent resin being not less than 0.03 and not more than 0.20, said two or more types of light-transparent fine particles being different from each other in refractive index.

According to a preferred embodiment of the present invention, the difference in refractive index between said two or more types of light-transparent fine particles is not less than 0.02 and not more than 0.10.

The refractive index of the light-transparent resin may be 1.49 to 1.53 with the refractive index of the light-transparent fine particles being 1.53 to 1.57 in one type and 1.58 to 1.62 in another type.

According to a preferred embodiment of the present invention, the antiglare film has a haze of not less than 10%.

The light-transparent resin may be an ionizing radiation-cured resin, the two or more types of light-transparent fine particles may have a particle diameter of 1 to 5 $\mu$m, and the content of the two or more types of light-transparent fine particles in the antiglare layer may be 5 to 30% by weight.

The light-transparent fine particles may be monodisperse organic fine particles, and the light-transparent fine particles may be inorganic fine particles.

The transparent substrate film may be a triacetylcellulose film.

According to another aspect of the present invention, there is provided a polarizing plate comprising: a polarizing element; and the above antiglare film, the antiglare film being stacked onto the surface of the polarizing element so that the transparent substrate film in its surface remote from the antiglare layer faces the polarizing element.

According to a further aspect of the present invention, there is provided a transmission type display device comprising: a flat, light-transparent display; a light source device for backlighting the light-transparent display; and the above antiglare film, the antiglare film being stacked on the surface of the light-transparent display.

BRIEF DESCRIPTION OF THE DRAWINGS

FIG. 1 is a cross-sectional view of an antiglare film according to an embodiment of the present invention;

FIG. 2 is a cross-sectional view of a polarizing plate using an antiglare film according to an embodiment of the present invention; and FIG. 3 is a cross-sectional view of a transmission type display device using an antiglare film according to an embodiment of the present invention.

BEST MODE FOR CARRYING OUT THE INVENTION

Embodiments of the present invention will be described in more detail with reference to the accompanying drawings.

As shown in FIG. 1, an antiglare film 10 according to an embodiment of the present invention comprises a transparent substrate film 12 and an antiglare layer 18 stacked onto the transparent substrate film 12, the antiglare layer 18 being formed of a light-transparent resin 14 containing, for example, first light-transparent fine particles 16 and second light-transparent fine particles 46. Here the antiglare film of the present invention will be described in terms of two types of light-transparent fine particles different from each other in refractive index. However, it should be noted that more than two types of light-transparent fine particles may be used.

The transparent substrate film 12 is a resin film, such as a triacetylcellulose film. The light-transparent resin 14 comprises a resin that has been cured after coating onto the transparent substrate film 12, for example, a cured product of an ultraviolet-curable resin (refractive index 1.51). The first light-transparent fine particles 16 may be fine particles of a light-transparent resin, for example, beads of an acryl-styrene copolymer (refractive index 1.55), and the second light-transparent fine particles 46 may be fine particles of a light-transparent resin, for example, styrene beads (refractive index 1.60).

The reason why the difference in refractive index between the light-transparent fine particles 16 and 46 and the light-transparent resin 14 is limited to not less than 0.02 and not more than 0.20 is as follows. In terms of antiglare properties, a refractive index difference of less than 0.02 is too small to provide light diffusing effect, while a refractive index difference exceeding 0.2 causes excessively large light diffusion which whitens the whole film. The refractive index difference is more preferably not less than 0.02 and not more than 0.11, most preferably not less than 0.03 and not more than 0.09.

Regarding the light-transparent fine particles, mixing two or more types of light-transparent fine particles having different refractive indexes permits the refractive index of the light-transparent fine particles to be regarded as the average refractive index value which depends upon the refractive indexes and mixing ratio of the two or more types of light-transparent fine particles. Therefore, the refractive index can be accurately regulated by varying the mixing ratio of the two or more types of light-transparent fine particles. This arrangement can render the regulation of the refractive index easier than the regulation of the refractive index in the case where use is made of a single type of light-transparent fine particles, and thus can make it possible to easily carry out various designs of the antiglare film.

In the light-transparent fine particles, the difference in refractive index between the first light-transparent fine particles 16 and the second light-transparent fine particles 46 is preferably not less than 0.02 and not more than 0.10. A refractive index difference of less than 0.02 is too small to satisfactorily regulate the refractive index by mixing both types of the light-transparent fine particles. On the other hand, when the refractive index difference is larger than 0.10, the light diffusion properties are determined by the light-transparent fine particles having a higher refractive index. The refractive index difference is more preferably not less than 0.02 and not more than 0.08, most preferably not less than 0.03 and not more than 0.07.

The particle diameter of the light-transparent fine particles 16 and 46 is preferably not less than 1.0 $\mu$m and not more than 5.0 $\mu$m. When the particle diameter is less than 1.0 $\mu$m, the light diffusing effect cannot be attained without significantly increasing the amount of the light-transparent fine particles added to the light-transparent resin 14. On the other hand, when the particle diameter exceeds 5.0 $\mu$m, the surface of the antiglare layer 18 is rough, unfavorably resulting in increased haze. The diameter of the light-transparent fine particles is more preferably not less than 2 $\mu$m and not more than 4 $\mu$m.

The light-transparent fine particles 16 and 46 may be monodisperse organic fine particles or inorganic fine particles. The smaller the variation in particle diameter, the smaller the variation in scattering properties and the easier the design of the haze.

The above constitution can prevent the whole film from being whitened due to a small difference in refractive index between the light-transparent fine particles 16 and 46 as fillers and the light-transparent resin 14 and, while maintaining high sharpness of transmitted images, can average light passing through the antiglare film 10 by virtue of the light diffusing effect.

Materials for the transparent substrate film 12 include transparent resin films, transparent resin plates, transparent resin sheets, and transparent glass.

Transparent resin films usable herein include triacetyl cellulose (TAC), polyethylene terephthalate (PET), diacetylenecellulose, cellulose acetate butyrate, polyether sulfone, polyacrylic resin, polyurethane resin, polyester, polycarbonate, polysulfone, polyether, polymethyl pentene, polyether ketone, and (meth)acrylonitrile films. The thickness thereof is generally about 25 to 1,000 $\mu$m.

The transparent substrate film 12 is particularly preferably a birefringence-free TAC film, because the antiglare film can be stacked onto a polarizing element to prepare a polarizing plate (described below) and, in addition, the polarizing plate can be used to prepare a liquid crystal display device having excellent display quality.

The transparent substrate film 12 is particularly preferably a PET film from the viewpoint of the heat resistance and solvent resistance at the time of coating by various coating methods to form the antiglare layer 18 and, in addition, fabricability such as mechanical strength.

Materials for the light-transparent resin 14 constituting the antiglare layer 18 may be mainly classified into three types of materials, that is, resins curable by ultraviolet or electron beam irradiation, that is, ionizing radiation-curable resins, ionizing radiation-curable resins with a thermoplastic resin and a solvent incorporated therein, and thermosetting resins. The thickness thereof is generally about 0.5 to 50 μm, preferably 1 to 20 μm, more preferably 2 to 10 μm.

The film-forming component used in the ionizing radiation-curable resin composition is preferably one having an acrylate functional group, and examples thereof include relatively low-molecular weight polyester resin, polyether resin, acrylic resin, epoxy resin, urethane resin, alkyd resin, spiroacetal resin, polybutadiene resin, and polythiol-polyene resin, oligomers or prepolymers of (meth)acrylate (the term "(meth)acrylate" used herein referring to acrylate and methacrylate) or the like of polyfunctional compounds, such as polyhydric alcohols, and ionizing radiation-curable resins containing a relatively large amount of a reactive diluent. Reactive diluents usable herein include monofunctional monomers, such as ethyl (meth)acrylate, ethylhexyl (meth) acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa (meth)acrylate, 1,6-hexanediol di(meth)acrylate, or neopentyl glycol di(meth)acrylate.

When the ionizing radiation-curable resin is used as an ultraviolet-curable resin, it is possible to incorporate, into the ionizing radiation-curable resin composition, a photopolymerization initiator, such as an acetophenone compound, a benzophenone compound, Michler's benzoyl benzoate, an α-amyloxime ester, or a thioxanthone compound, and a photosensitizer, such as n-butylamine, triethylamine, or tri-n-butylphosphine. In the present invention, it is particularly preferred to incorporate urethane acrylate or the like as an oligomer and dipentaerythritol hexa(meth)acrylate or the like as a monomer.

Further, regarding the light-transparent resin 14 constituting the antiglare layer 18, a solvent evaporation type resin may be incorporated into the ionizing radiation-curable resin. The solvent evaporation type resin is mainly a thermosetting resin, and examples thereof include phenolic resins, urea resins, diallyl phthalate resins, melamine resins, guanamine resins, unsaturated polyester resins, polyurethane resins, epoxy resins, aminoalkyd resins, melamine-urea copolycondensed resins, silicone resins, and polysiloxane resins.

Any solvent evaporation type thermoplastic resin commonly used in the art may be added to the ionizing radiation-curable resin. When the transparent substrate film 12 is particularly a cellulosic resin, such as TAC, cellulosic resins, such as nitrocellulose, acetylcellulose, cellulose acetate propionate, and ethylhydroxyethylcellulose, are advantageous as the solvent evaporation type resin to be incorporated into the ionizing radiation-curable resin from the viewpoints of the adhesion and transparency of the coating.

The ionizing radiation-curable resin composition may be cured by a conventional curing method for the ionizing radiation-curable resin composition, that is, by electron beam or ultraviolet irradiation.

For example, in the case of curing by electron beam irradiation, use may be made of electron beams having an energy of 50 to 1000 KeV, preferably 100 to 300 KeV, emitted from various electron beam accelerators, such as Cockcroft-Walton accelerator, van de Graaff accelerator, resonance transformer, insulated core transformer, linear, dynamitron, and high-frequency electron accelerators. On the other hand, in the case of curing by ultraviolet irradiation, ultraviolet light emitted from light sources, such as ultrahigh pressure mercury lamps, high pressure mercury lamps, low pressure mercury lamps, carbon arc, xenon arc, and metal halide lamps, may be utilized.

Plastic beads are suitable as the first light-transparent fine particles 16 incorporated into the antiglare layer 18. Particularly preferred are plastic beads wherein the transparency is high and the refractive index difference from the light-transparent resin 14 falls within the above value range.

Plastic beads usable as the first light-transparent fine particles 16 include acryl-styrene copolymer beads (refractive index 1.56), melamine beads (refractive index 1.57), and polycarbonate beads (refractive index 1.57).

The second light-transparent fine particles 46 incorporated into the antiglare layer 18 are suitably plastic beads. Particularly preferred are plastic beads wherein the transparency is high and the refractive index difference from the light-transparent resin 14 falls within the above value range.

Plastic beads usable as the second light-transparent fine particles 46 include styrene beads (refractive index 1.60) and polyvinyl chloride beads (refractive index 1.60).

For the first light-transparent fine particles 16 and the second light-transparent fine particles 46, suitable plastic beads are properly selected from those having a particle diameter of 1 to 5 μm, and are incorporated in an amount of 5 to 30 parts by weight based on 100 parts by weight of the light-transparent resin. In this case, when the first light-transparent fine particles 16 and the second light-transparent fine particles 46 have the same particle diameters, the freedom in selection of the ratio of the first light-transparent fine particles 16 to the second light-transparent fine particles 46 can be enhanced. To this end, monodisperse organic fine particles having well-regulated particle diameter are preferably used.

When the first light-transparent fine particles 16 and the second light-transparent fine particles 46 as described above are added, the light-transparent fine particles are likely to settle in the resin composition (light-transparent resin 14). In order to prevent settling, inorganic fillers, such as silica, may be added. In this connection, it should be noted that, although the effect of preventing the light-transparent fine particles from settling improves with increasing the amount of the inorganic filler added, the transparency of the coating is adversely affected. For this reason, preferably, an inorganic filler having a particle diameter of not more than 0.5 μm is added in an amount of about less than 0.1% by weight, that is, in such an amount that the coating transparency of the light-transparent resin 14 is not deteriorated.

Next, the step of forming the antiglare layer 18 on the surface of the transparent substrate film 12 will be described.

A resin, for the light-transparent resin 14, with the first light-transparent fine particles 16 and the second light-transparent fine particles 46 being mixed therein is coated on the transparent substrate film 12. The coated transparent substrate film 12 is allowed to stand until concaves and convexes are satisfactorily formed on the surface of the light-transparent resin by the first light-transparent fine particles 16 and the second light-transparent fine particles 46. Thereafter, when the resin for the light-transparent resin 14 is an electron beam-curable resin or an ultraviolet-curable resin, an electron beam or ultraviolet light is applied to cure the resin.

Thus, an antiglare layer 18 is formed which is smooth on the whole and has concaves and convexes created by the first light-transparent fine particles 16 and the second light-transparent fine particles 46. Although an antiglare layer having concaves and convexes on its surface has been described, the antiglare layer may be free from the concaves and convexes.

Further, the surface of the antiglare layer 18 may be embossed or planished.

The haze of the antiglare film is measured with HR-100, manufactured by Murakami Color Research Laboratory according to JIS K 7105. The haze is suitably not less than 10%, preferably 10 to 40%, more preferably 10 to 35%.

Next, embodiments of the polarizing plate according to the present invention shown in FIG. 2 will be described.

As shown in FIG. 2, a polarizing plate 20 according to this embodiment has a construction such that an antiglare film 11, which is the same as described above, is provided on one side (upper side in FIG. 2) of a polarizing layer (a polarizing element) 22.

The polarizing layer 22 is sandwiched between two transparent substrate films, a TAC film 12A and a TAC film 24. The polarizing layer 22 has a three-layer structure wherein the first and third layers each are a film of a polyvinyl alcohol (PVA) with iodine being added thereto and the second layer as an intermediate layer is a PVA film.

The antiglare film 11 has a layer construction such that the antiglare layer 18 is stacked onto the TAC film 12A.

The TAC, which is provided as the transparent substrate on both outsides of the polarizing layer 22, is free from birefringence and does not disturb polarized light, and, thus, stacking of the TAC film on the PVA film and the film of PVA+iodine as the polarizing element does not cause disturbance of polarized light. Therefore, the use of the polarizing plate 20 enables the realization of liquid crystal display devices having high display quality.

The polarizing element constituting the polarizing layer 22 in the polarizing plate 20 include a PVA film which has been colored with iodine or a dye and then stretched, and, in addition, a polyvinyl formal film, a polyvinyl acetal film, and a saponified ethylene-vinyl acetate copolymer film.

In stacking the films constituting the polarizing layer 22, the TAC film is preferably saponified from the viewpoint of improving the adhesion and preventing the electrification.

Next, embodiments of the transmission type display device of the present invention in the form of a liquid crystal display device shown in FIG. 3 will be described.

A liquid crystal display device 30 shown in FIG. 3 is a transparent liquid crystal display device wherein a polarizing plate 32, which is the same as the polarizing plate 20, a liquid crystal panel 34, and a polarizing plate 36 are stacked in that order on top of one another and, in addition, a backlight 38 is disposed on the backside of the assembly in its polarizing plate 36 side.

Liquid crystal modes usable in the liquid crystal panel 34 in the liquid crystal display device 30 include twisted nematic type (TN), super-twisted nematic type (STN), phase transition type (PC), and polymer dispersed type (PDLC).

The drive mode of the liquid crystal may be of either a simple matrix type or an active matrix type. In the case of the active matrix type, driving methods, such as TFT and MIM, are usable.

Further, the liquid crystal panel 34 may be of either a color type or a monochrome type.

EXAMPLES

Examples of the present invention will be described in comparison with comparative examples.

Example 1

50 parts by weight of an ultraviolet-curable resin [PETA (refractive index 1.51), manufactured by Nippon Kayaku Co., Ltd.] for a light-transparent resin for constituting an antiglare layer, 2 parts by weight of a curing initiator (Irgacure 184, manufactured by Ciba-Geigy Limited), 2 parts by weight of acryl-styrene beads (particle diameter 3.5 μm, refractive index 1.55; manufactured by Soken Chemical Engineering Co., Ltd.) as first light-transparent fine particles, and 2 parts by weight of styrene beads (particle diameter 3.5 μm, refractive index 1.60; manufactured by Soken Chemical Engineering Co., Ltd.) as second light-transparent fine particles were mixed with 50 parts by weight of toluene to prepare a coating liquid. The coating liquid was coated onto a triacetylcellulose film (TD-80U, manufactured by Fuji Photo Film Co., Ltd.) to a thickness of 3 μm on a dry basis. The solvent was evaporated at 70° C. for one min, followed by application of ultraviolet light (100 mJ) to prepare an antiglare film.

The haze of the antiglare film was measured with HR-100 manufactured by Murakami Color Research Laboratory according to JIS K 7105 and found to be 20%.

Further, the antiglare film was visually evaluated for the sharpness of transmitted images. As a result, the transmissive visibility was good.

This antiglare film was used to prepare a polarizing plate which was then laminated onto an XGA liquid crystal panel having a size of 12.1 in., followed by observation of images. As a result, neither scintillation nor a catch of a reflected image occurred.

Example 2

An antiglare film was prepared in the same manner as in Example 1, except that the amount of the acryl-styrene beads (particle diameter 3.5 μm, refractive index 1.55; manufactured by Soken Chemical Engineering Co., Ltd.) as the first light-transparent fine particles was changed to 4 parts by weight and the amount of the styrene beads (particle diameter 3.5 μm, refractive index 1.60; manufactured by Soken Chemical Engineering Co., Ltd.) as the second light-transparent fine particles was changed to 0.5 part by weight.

The antiglare film thus obtained was evaluated for various items in the same manner as in Example 1. As a result, the haze was 30%.

For the antiglare film, the sharpness of transmitted images was visually evaluated and found to be good as with that in Example 1.

This antiglare film was used to prepare a polarizing plate which was then laminated onto an XGA liquid crystal panel having a size of 12.1 in., followed by observation of images. As a result, neither scintillation nor a catch of a reflected image occurred. In this case, the effect of preventing scintillation was relatively better than that in the antiglare film prepared in Example 1.

Example 3

An antiglare film was prepared in the same manner as in Example 1, except that the amount of the acryl-styrene beads (particle diameter 3.5 μm, refractive index 1.55; manufactured by Soken Chemical Engineering Co., Ltd.) as the first light-transparent fine particles was changed to 0.5 part by weight and the amount of the styrene beads (particle diameter 3.5 μm, refractive index 1.60; manufactured by Soken Chemical Engineering Co., Ltd.) as the second light-transparent fine particles was changed to 4 parts by weight.

The antiglare film thus obtained was evaluated for various items in the same manner as in Example 1. As a result, the haze was 15%.

For the antiglare film, the sharpness of transmitted images was visually evaluated and found to be good as with that in Example 1.

This antiglare film was used to prepare a polarizing plate which was then laminated onto an XGA liquid crystal panel having a size of 12.1 in., followed by observation of images. As a result, neither scintillation nor a catch of a reflected image occurred. In this case, the contrast was relatively better than that in the case of the antiglare film prepared in Example 1.

Comparative Example 1

An antiglare film was prepared in the same manner as in Example 1, except that the amount of the styrene beads (particle diameter 3.5 μm, refractive index 1.60; manufactured by Soken Chemical Engineering Co., Ltd.) as the second light-transparent fine particles was changed to 2 parts by weight and the acryl-styrene beads (particle diameter 3.5 μm, refractive index 1.55; manufactured by Soken Chemical Engineering Co., Ltd.) as the first light-transparent fine particles were not used.

The antiglare film thus obtained was evaluated for various items in the same manner as in Example 1. As a result, the haze was 15%, and the sharpness of transmitted images was also good. However, scintillation and the catch of a reflected image occurred. Thus, for the antiglare film, all the evaluation results were not simultaneously satisfactory.

According to the present invention, antiglare films can be easily provided which, in a desired range of haze, can improve the sharpness of transmitted images and can reduce the scintillation without sacrifice of external light reflection preventive properties.

What is claimed is:

1. An antiglare film comprising:

a transparent substrate film; and an antiglare layer provided on the transparent substrate film, the antiglare layer being formed of a light-transparent resin containing two or more types of light-transparent fine particles, the difference in refractive index between the light-transparent fine particles and the light-transparent resin being not less than 0.03 and not more than 0.20, said two or more types of light-transparent fine particles being different from each other in refractive index.

2. The antiglare film according to claim 1, wherein the difference in refractive index between said two or more types of light-transparent fine particles is not less than 0.02 and not more than 0.10.

3. The antiglare film according to claim 1 or 2, wherein the refractive index of the light-transparent resin is 1.49 to 1.53 and the refractive index of the light-transparent fine particles is 1.53 to 1.57 in one type and 1.58 to 1.62 in another type.

4. The antiglare film according to claim 1, which has a haze of not less than 10%.

5. The antiglare film according to claim 1, wherein the light-transparent resin is an ionizing radiation-cured resin, the two or more types of light-transparent fine particles have a particle diameter of 1 to 5 μm, and the content of the two or more types of light-transparent fine particles in the antiglare layer is 5 to 30% by weight.

6. The antiglare film according to claim 5, wherein the light-transparent fine particles are monodisperse organic fine particles.

7. The antiglare film according to claim 5, wherein the light-transparent fine particles are inorganic fine particles.

8. The antiglare film according to claim 1, wherein the transparent substrate film is a triacetylcellulose film.

9. A polarizing plate comprising:

a polarizing element;

and the antiglare film according to claim 1, the antiglare film being stacked onto the surface of the polarizing element so that the transparent substrate film in its surface remote from the antiglare layer faces the polarizing element.

10. A transmission type display device comprising:

a flat, light-transparent display;

a light source device for backlighting the light-transparent display;

and the antiglare film according to claim 1, the antiglare film being stacked on the surface of the light-transparent display.

* * * * *